United States Patent [19]

Dash

[11] Patent Number: 4,573,048
[45] Date of Patent: Feb. 25, 1986

[54] HIGH SPEED LINK FOR ROTATING DISPLAY

[75] Inventor: Glen R. Dash, Watertown, Mass.

[73] Assignee: Dash Strauss Associates, Watertown, Mass.

[21] Appl. No.: 731,769

[22] Filed: May 8, 1985

Related U.S. Application Data

[63] Continuation of Ser. No. 674,481, Nov. 23, 1984, abandoned, which is a continuation of Ser. No. 335,739, Dec. 30, 1981, abandoned.

[51] Int. Cl.⁴ .............................................. G08C 19/10
[52] U.S. Cl. ............................ 340/870.37; 324/61 R; 340/870.28
[58] Field of Search ........................ 340/870.37, 870.44, 340/870.28, 755, 718; 324/61 R; 318/662; 73/769; 361/299, 329

[56] References Cited

U.S. PATENT DOCUMENTS

| | | | |
|---|---|---|---|
| 3,097,261 | 7/1963 | Schipper et al. | 340/755 |
| 3,222,668 | 12/1965 | Lippel | 340/870.37 |
| 3,303,701 | 2/1967 | Matsuura et al. | 340/870.28 |
| 3,702,467 | 11/1972 | Melnyk | 340/870.37 |
| 3,784,897 | 1/1974 | Norrie | 340/870.37 |
| 3,824,845 | 7/1974 | Huebner | 340/870.37 |
| 3,860,918 | 1/1975 | Cencel | 340/870.37 |
| 3,938,113 | 2/1976 | Dobson et al. | 340/870.37 |
| 4,011,551 | 3/1977 | Adler | 340/870.28 |
| 4,160,973 | 7/1979 | Berlin | 340/755 |
| 4,242,666 | 12/1980 | Reschovsky et al. | 340/870.37 |

*Primary Examiner*—John W. Caldwell, Sr.
*Assistant Examiner*—Michael F. Heim
*Attorney, Agent, or Firm*—Cesari & McKenna

[57] ABSTRACT

A data line comprising a stationary disk (34) and an opposed rotating disk (36) couples data from a stationary data source (30) to a rotating data module (12) to which the rotating disk (36) is fixed. The rotating disk (36) includes an insulating substrate (38) on which concentric arcuate strips (40) are formed in registration with corresponding strips on the stationary disk (36). The link transmits data from one disc (34) to the other (36) by capacitive coupling between corresponding strips to the two discs. The several pairs of corresponding strips are in separate parallel data channels, and crosstalk between the channels is prevented by intermediate ground strips (42) disposed between the data-carrying strips (40).

5 Claims, 4 Drawing Figures

U.S. Patent  Feb. 25, 1986  4,573,048
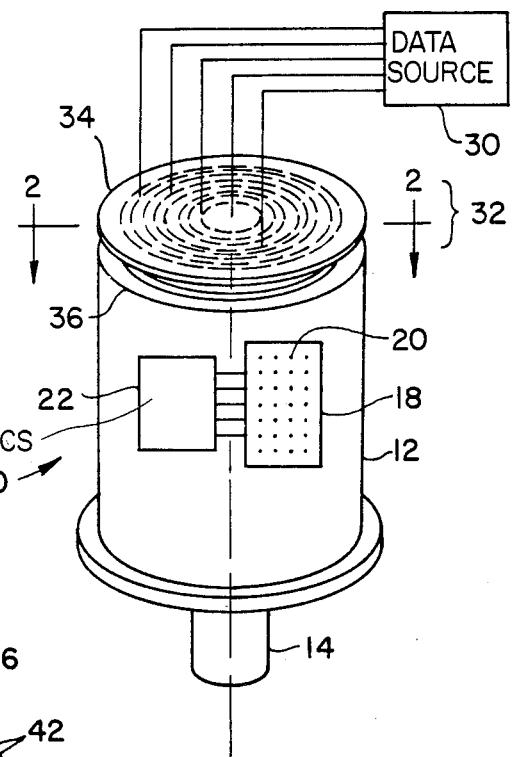
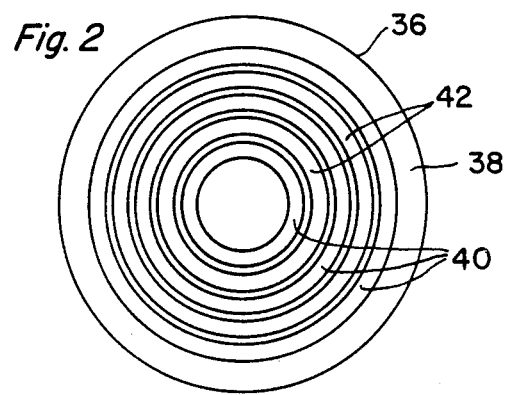
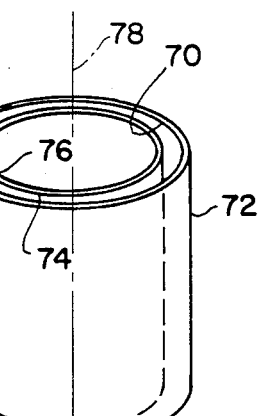
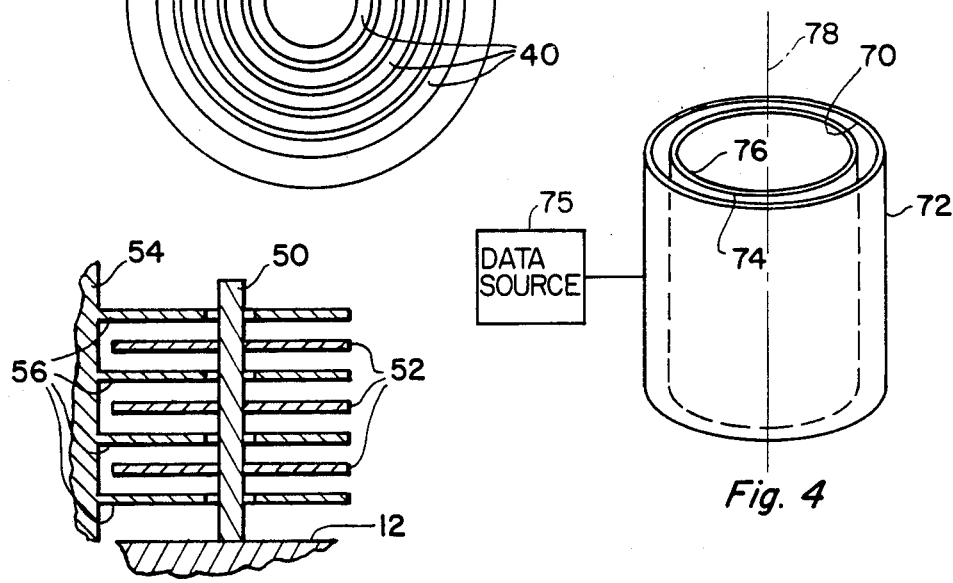

HIGH SPEED LINK FOR ROTATING DISPLAY

This is a continuation of application Ser. No. 674,481, filed Nov. 23, 1984, which is a continuation of application Ser. No. 335,739, filed Dec. 30, 1981, both now abandoned.

BACKGROUND OF THE INVENTION

1. Field of the Invention

The invention relates to data links and, more particularly, to high speed data links for rotating displays.

2. Prior Art

Data links carry information between spatially separated points. As society's ability to generate and process data increases, the need for data links which can transmit large volumes of data at high speeds in diverse environments has increased concomitantly.

One field of technology in which the need for reliable, high speed, high volume data links has become critical is the field of rotating displays. An example of such a display is described in U.S. Pat. No. 4,160,973 issued July 10, 1979 to Edward P. Berlin, Jr., and entitled "Three-Dimensional Display." The invention described therein comprises a two-dimensional planar display formed from a matrix arrangement of light emitting diodes and rotated about a central axis to sweep out a three dimensional volume in which the physiological effects of vision persistence are used to provide the appearance of a true three-dimensional display. The system described therein provides for the display of in excess of four million "points" or pixels, each of which can be displayed in any one of 16 intensity levels using a four-bit gray scale. Accordingly, an excess of 16 million bits of information are required for the display. If each element is to be changeable at a rate which is comparable to the frame rate of television raster displays so as to reduce "flicker" of the display, a data rate of nearly 500 million bits per second is called for. This imposes extraordinary demands on the data communications link between the rotating display and the stationary data source.

Heretofore it has been proposed to use an optical data link, specifically, one or more photodiode transmitters mounted on the stationary data source and a corresponding number of phototransistor receivers mounted on the rotating display, the photodiodes and the corresponding phototransistors being mechanically and electrically separated from each other and being coupled only via an optical path. This type of data link, while particularly suited for this application, nonetheless possesses several disadvantages. To begin with, the data rate that can be transmitted over a single photodiode-phototransistor pair is limited, and a number of such coupling elements operating in parallel may be required to transmit data reliably at the rates called for by this type of display. However, when more than a single photodiode-phototransistor pair is utilized, the additional elements must be placed off-axis and coupling between the stationary source and the moving display becomes a severe problem. Further, it is critically important that dust or other environmental contamination be excluded from the operating environment, since this can introduce errors in the data transmission. This is particularly a problem at the high data rates called for by such a display.

BRIEF SUMMARY OF THE INVENTION

A. Objections of the Invention

Accordingly, it is an object of the invention to provide an improved high-speed data link for transmission of data between a stationary device element and a rotating device.

Further, it is an object of the invention to provide an improved data link accomodating transmission of data between a stationary device and a rotating device at speeds on the order of millions of bits per second.

Another object of the invention is to provide a high-speed data link for interconnecting a stationary data source and a rotating data sink and that is characterized by high reliability, relative imperviance to dust or similar environmental contamination, and that is comparatively inexpensive to produce. Further, it is an object to provide an improved high-speed data link for transmitting data between a stationary data source and a rotating data sink that is simple in design, construction, operation, and maintenance.

B. Brief Description of the Invention

In accordance with the present invention, I provide for the transfer of data between a stationary device such as a data source and a rotating device by forming a first electrically conductive surface on the rotating element and a second, corresponding electrically conductive surface on the stationary device, immediately adjacent, but slightly spaced from, the first conducting surface. The two surfaces effectively form a parallel plate capacitor such that information in the form of varying electric potentials applied to one plate is transmitted through the gap between them in the form of an electromagnetic field to the other plate from which it is applied to the utilization circuitry.

In the preferred embodiment described herein, the electrically conducting surfaces are in the form of one or more coplanar, radially separated, arcuate strips mounted on opposed pairs of thin, flat, insulating plates positioned parallel to each other and separated by an air gap of the order of a 64th of an inch. One of the plates is fixed to the stationary device; the other is fixed to the rotating device, and thus rotates with it. The discs are positioned such that the conductive surfaces on the respective discs face each other and are located about a common axis which comprises the axis of the rotating disc. Accordingly, as the rotating disc rotates with respect to the stationary disc, the arcuate strips remain in the same relative position with respect to each other, because of the circular symmetry of the system, and the capacitance between them thus remains essentially constant, except for minor variations caused by imperfections in alignment for other sources. The variations can be held to very small values, usually much less than the noise threshold for the associated data source and utilization circuitry, and thus they do not degrade system performance.

The electrically conductive surfaces may take a variety of forms, dependent on the system needs. For example, in cases in which the data rate is such that a single data channel is sufficient, the conductive surfaces may divide the faces of the respective discs into only two segments, so as to form a single capacitor for the data channel and a corresponding capacitor for the ground return. In contrast, where multiple data channels are needed, the conductive surfaces may take the form of a plurality of radially separated arcuate strips. In this embodiment, it is desirable to separate the various strips on a given disc by intermediate ground planes to prevent crosstalk between the separate channels formed by the respective strips. Other embodiments may also be utilized. Thus, a plurality of pairs of discs may be utilized, there being one rotating disc and one stationary disc in each pair. The discs may then be mounted in a cylindrical arrangement about concentric axes, the stationary discs being effectively interdigitated with the rotating discs to form the respective data channels (See FIG. 3). Alternatively, the data link may take the form of concentric cylinders, one stationary and one rotating, having the conductive surfaces being mounted on the opposed wall surfaces facing each other. Other forms may also be used.

The data link of the present invention makes rotating displays of the kind shown in U.S. Pat. No. 4,160,973, referred to above, feasible. The link can readily accomodate data rates of the order of 500 million bits per second, and it is relatively impervious to degradation by dust or other contaminants normally present in an office or laboratory environment. It is simple and relatively inexpensive to manufacture, and has extremely low maintenance requirements. Installation is simple, and its operation is readily and quickly checked with even the simplest of testing instruments. Accordingly, it represents a marked advanced over data links heretofore utilized for rotating displays.

DETAILED DESCRIPTION OF THE INVENTION

The foregoing and other and further objections and features of the invention will be more readily understood on reference to the following detailed description of the invention, when taken in conjunction with the accompanying drawings, in which:

FIG. 1 is a view in perspective of a rotating three-dimensional display having a data link therein constructed in accordance with the present invention:

FIG. 2 is a planar view along the lines 2—2 of FIG. 1 showing the construction of the coupling element of the data link in accordance wirh the preferred embodiment of the invention;

FIG. 3 is a side vertical view of an alternative form of data link in accordance with the present invention; and FIG. 4 is a view in perspective of still another alternative form of data link in accordance with the present invention.

In FIG. 1, a data display 10 comprises a data module 12 mounted on a base 14 for rotation about a vertical axis 16. Contained within the data module 12 is a two-dimensional, planar display panel 18 containing a matrix of light-emitting diodes 20 forming a two dimensional display. The diodes are energized in a desired sequence by display electronics 22. As the module 12 is rotated about axis 16, the panel 18 sweeps out a volume having data points defined by the light emitting diodes 20 which are positioned at different locations at different times. By selectively energizing these diodes as they sweep out this volume, a human observer, because of the persistence of vision, sees what appears to be a three-dimensional display of points corresponding to successive positions of the diodes 20. Data is coupled into the module 12 from a data source 30 via a data link 32 comprising an upper stationary disc or plate 34 and a lower disc or plate 36 fixed to the module 12 and rotating with it. The disc 36 is shown in more detail in FIG. 2.

Referring now to that figure, the disc 36 comprises an insulating substrate 38 such as glass, a non-conductive plastic, or the like, on which are formed radially-separated, arcuate strips 40 separated by intermediate arcuate strips 42. The strips 40 comprise conductive surfaces formed by depositing a thin, electrically conductive layer of material such as copper, aluminum, or other conductive material in separate arcuate strips on one surface of the disc 38. The strips 40, together with the corresponding strips on disc 34, form separate data paths for the transfer of data from data source 30 to data module 12. The strips 42 serve as ground planes for the strips 40 to prevent crosstalk between the separate data paths.

The precise dimensions of the discs and the arcuate segments are not critical. In one embodiment, the invention was constructed utilizing plexiglass discs on which were formed four separate data strips or channels, and four intermediate ground strips. The outermost data strip extended from a radius of approximately 6.2 inches to a radius of approximately 6.5 inches, and had an area of approximately 12.5 square inches and a capacitance of approximately 180 picofarads (pf). The remaining data channels had similar areas and similar capacitances. The outermost ground strip extended from 6 inches to approximately 6⅛ inches and had an area of approximately 4.8 square inches and a capcitance of approximately 70 picofarads. The remaining ground strips were of similar area and capacitance. The discs were separated by a gap of 1/64 inch.

FIG. 3 shows an alternative embodiment of the data link of the present invention. A shaft 50 mounted for rotation with data module 12 has mounted thereon discs 52 of the kind similar to that shown in FIG. 2. Adjacent shaft 50 and discs 52 is a column 54 supporting discs 56 therefrom in cantilever fashion. The discs 56 have central apertures 58 to accommodate shaft 50. Shaft 50 is attached to rotary source 12 for rotation therewith. A lead (not shown) extends downwardly along shaft 50 from the respective discs 52 to transfer the data coupled to them from discs 56 to the data module 12.

The structure shown in FIG. 3 may be assembled in a variety of ways. In one embodiment, discs 52 may be separable from the shaft 50 so that the discs 52 are first placed loosely on top of the corresponding and associated discs 56 and the shaft 50 then moved upwardly through the discs 52 and 56. The discs 52 may then be rigidly adhered to the shaft 50 by a snap-lock structure, or the like.

A further alternative embodiment of the data link of the present invention is shown in FIG. 4. The data link in this embodiment takes the form of a parallel-plate cylindrical capacitor formed by a first conductive surface 70 on the inside of a stationary cylinder 72 spaced from a a corresponding conductive surface 74 on a rotating cylinder 76 contained in the three-dimensional display. The cylinders 72 and 76 are separated by a slight air gap which allows relative motion between the two cylinders but which is sufficiently small to provide adequate capacitance between the conductive surfaces 70 and 74 to accomodate transmission of data from a stationary data source 75 to the moveable display to which the cylinder 76 is connected. The operation of the embodiment of FIG. 4 is similar to that previously described and will not be described in further detail. However, it should be noted that, as was the case with the previous embodiments, the embodiment of FIG. 4 may take the form of a single data channel (in which case the entire surfaces 70 and 74 contain a single conductive coating for the data path and a corresponding coating for the ground return) or may take the form of multiple data channels (in which case the conductive surfaces 70 and 74 are formed into a series of adjacent, but separate, conductive segments extending arcuately about a central axis 78 and extending in a vertical direction parallel to this axis).

Conclusion

From the foregoing, it will be seen that I have provided a high-speed data link that is particularly suited to the requirements of a rotating display having high data rate requirements. The data link is simple to construct and to maintain, and is comparatively immune to dust and similar kinds of contamination normally found in office and laboratory environments which can pose severe problems for other types of data links such as optically-coupled links. The link is inexpensive to manufacture, yet accommodates the unusually high data rate required for rotating displays. Thus, it is ideally suited to such displays.

Having illustrated and described my invention, I claim:

1. A wireless high-speed data link for interconnecting a stationary data device and a rotating data device, the data link comprising:
   A. a first group of interdigitated conductive elements on the stationary device; and
   B. a second group of interdigitated conductive elements on the rotating device; wherein:
   C. the first and second groups together include a first set of conductive elements, each conductive element of the first set from the first group being positioned closely adjacent a corresponding conductive element of the first set from the second group to form a capacitor that establishes a signal path interconnecting the data devices and that has a capacitance that is substantially constant with rotation of the rotating device, the first set of conducting devices establishing a plurality of signal paths;
   D. the first and second groups together include a second set of conductive elements, each conductive element of the second set from the first group being positioned closely adjacent a corresponding conductive element of the second set from the second group to form a capacitor that establishes a ground-return path interconnecting the data devices and that has a capacitance that is substantially constant with rotation of the rotating device; and
   E. a conductive element of the second set is disposed intermediate each pair of successive conductive elements of the first set.

2. A wireless high speed data link according to claim 1 wherein the conductive elements of the first group are positioned generally parallel to the conductive elements of the second group and are separated therefrom by a gap no greater than fractions of an inch.

3. A wireless high speed data link according to claim 1 wherein:
   A. the stationary data device includes a plurality of insulating disks on which the first group of conductive elements is mounted; and
   B. the rotating data device includes a plurality of insulating disks on which the second group of conductive elements is mounted, the insulating disks on the rotating data device being interdigitated with the insulating disks on the stationary data device.

4. A wireless high speed data link according to claim 1 wherein the conductive elements in each group comprise generally planar, arcuately extending, concentric, electrically conductive strips disposed in opposed relationship with the conductive strips of the other group.

5. A wireless high speed data link according to claim 1 wherein the conductive elements of each group comprise cylindrical shells concentric with the conductive elements of the other group.

* * * * *